United States Patent [19]

Albersdoerfer et al.

[11] Patent Number: 4,556,284
[45] Date of Patent: Dec. 3, 1985

[54] APPARATUS FOR COMBINING AN OPTICAL AND LASER SYSTEM AND INCLUDING A SELF-FOCUSSING OPTICAL FIBER BUNDLE

[75] Inventors: Otto Albersdoerfer, Feldafing; Heinz Blankenfeld, Germering; Wolfgang Kranz; Wolfgang Weckwerth, both of Munich, all of Fed. Rep. of Germany

[73] Assignee: Siemens Aktiengesellschaft, Berlin and Munich, Fed. Rep. of Germany

[21] Appl. No.: 577,294

[22] Filed: May 22, 1984

Related U.S. Application Data

[62] Division of Ser. No. 320,949, Nov. 13, 1981, abandoned.

[30] Foreign Application Priority Data

Dec. 19, 1980 [DE] Fed. Rep. of Germany ....... 3047958

[51] Int. Cl.⁴ .................. G02B 27/10; G02B 5/16
[52] U.S. Cl. .................. 350/174; 350/96.24; 362/32
[58] Field of Search ............. 350/174, 171, 173, 172, 350/538, 540, 541, 523–528, 96.24; 356/5, 28.1, 251, 73.1; 250/330, 333, 334, 341; 362/32, 259

[56] References Cited

U.S. PATENT DOCUMENTS 3,909,106  9/1975  Buhler ........................... 350/526
4,000,419 12/1976  Crost et al. ...................... 250/330
4,108,551  8/1978  Weber ............................. 356/5
4,309,746  1/1982  Rushworth ....................... 362/259

Primary Examiner—Jon W. Henry
Attorney, Agent, or Firm—Hill, Van Santen, Steadman & Simpson

[57] ABSTRACT

Apparatus for combining an optical and laser system as, for example, in weapons systems where sighting an observation is to be employed and wherein the optical channel may be a sighting device such as a periscope and wherein the laser may comprise a laser transmitter for telemetry or for the purposes of Identification Friend or Foe. The transparent optical system transmits light wave energy and also includes the emission range of the laser transmitter. There are problems of mounting the two systems due to space limitations and in the present invention the output of the laser radiation into the optical system is accomplished by the use of optical fiber bundles which extend from the laser transmitter to the optical system. The emitting surface of the optical fiber bundle can be mounted so as to introduce into the optical system the laser energy at a favorable location and with small amounts of space and the optical bundle can couple the laser radiation directly into the optical system or through the use of a beam divider. In certain embodiments, an additional focusing lens system can be placed between the emitting surface of the optical fiber bundle or an autofocusing optical fiber bundle can be utilized.

3 Claims, 4 Drawing Figures

4,556,284

APPARATUS FOR COMBINING AN OPTICAL AND LASER SYSTEM AND INCLUDING A SELF-FOCUSSING OPTICAL FIBER BUNDLE

This is a division of application Ser. No. 320,949 filed Nov. 13, 1981 now abandoned.

BACKGROUND OF THE INVENTION

1. Field of the Invention

This invention relates in general to sighting and observation installation for weapon systems utilizing an optical system such as a periscope.

In weapon systems such as combat tanks, anti-tank defense helicopters in addition to the optical and heat image installations for weapon tracking, laser transmitters for Identification Friend or Foe equipment and telemetry are utilized.

2. Description of the Prior Art

Additional uses of laser transmitters are for trajectory simulation and optical communication, as well as for the utilization of target marker designator, radio-control transmitters for guided missiles, and laser radar. For a number of reasons, it is desirable to coordinate the optical sighting system device and the laser system in such weapon systems.

SUMMARY OF THE INVENTION

An object of the invention is to allow common utilization of an optical channel with laser transmitting equipment with the minimum space utilization.

Because of functional expediency, it is not often times possible to combine the two separate systems since the laser transmitter and particularly the emitting element of the laser transmitter cannot be integrated into the optical installation for spatial reasons.

According to the invention, this object is achieved in that the optical system for the image formation is coupled to the laser transmitter which is remotely mounted from the optical system with optical fibers which are utilized as transmission lines and as input coupling elements for the laser radiation. The optical fibers have one end connected to the emitting surface of the laser transmitter, in other words the laser diode output coupling mirror of the other lasers and the other front end output is the emission surface for the laser beam input coupling into the optical system.

A solution according to the invention makes it possible to guide optical fibers which serve to guide the beam of the laser transmitter to a random location of the optical system and to provide the input coupling of the laser beam with a beam divider or directly into the system. The optical fibers can be adapted to the emitting surface of a laser diode or with the use of an optical coupling mirror to a gas or solid state laser.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

DESCRIPTION OF THE PREFERRED EMBODIMENTS

Figure 1:
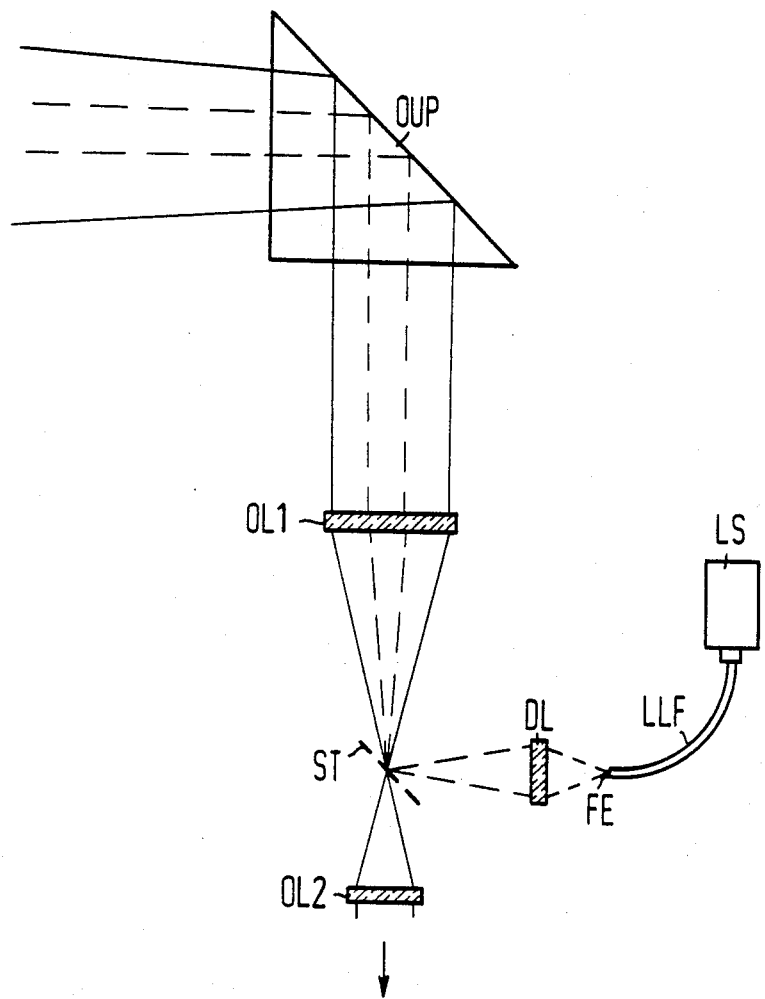
FIG. 1 illustrates a first embodiment of the invention in which an optical and laser system use a common optical channel and optical fiber bundle and beam divider are used for input coupling of the laser beam.

FIG. 1 illustrates the apparatus of the invention in which an optical system includes lens systems OL1 and OL2 mounted above each other and aligned with an optical inclination prism OUP for transmitting and receiving optical energy. This structure might be a periscope for example for observing enemy and friendly installations. A laser transmitter LS has its output coupled to the optical system with a optical fiber bundle LLF which has one end coupled to the output of the laser transmitter and has its second end FE mounted near a lens DL which transmits the laser energy to a beam divider ST mounted in the optical axis of the lens OL1 and OL2. The optical system can be designed as a periscope and can be part of the sighting device of a gunner or the Commanding Officer in a weapon system. The laser transmitter LS which is to be coordinated with the optical system can serve the purpose of Friend or Foe Identification, as a target designator, an optical communication system or distance range finding apparatus. Since the periscope is transparent in a light wave range which also includes the emission range of a laser transmitter for example 0.9 μm, the advantage results that an existing optical channel can be utilized by the laser system which will save space and cost. The subsequent integration of a laser transmitter or transmitters into an existing optical system presents difficulties because of the space limitations for the input coupling of the laser beam into the optical system.

Thus, in all the embodiments illustrated in FIGS. 1-4 adjustments of the citing line of the optical system will not alter the laser beam divergence and, thus, such altering of the optical systems does not require focusing of the laser system.

By utilizing an optical fiber bundle LLF according to the invention which is coupled to the laser transmitter, the laser transmitter LS can be spacely mounted separate from the optical system. The front end FE of the optical fiber bunder LLF is directed toward the optical system and comprises the emitting surface of the laser transmitter. So as to obtain the low beam divergent which is the order of magnitude of a few mrad necessary for telemetry or to obtain IFF interrogation from the gun sight objective lens which is the inclination prism OUP, a reduction of the transmitting divergence can occur pursuant to utilization of a laser diode with a large natural divergent of the laser beam by utilizing the additional lens system DL. This also can be used with lasers with a natural beam divergent such as 10 mrad in which the output divergence is small. The input coupling of the laser beam into the optical system is accomplished with the beam divider ST which consists of a semitransmissive plate which does not obstruct the optical beam path for the image formation on an eye piece mounted below the lens OL2 but which will reflect the laser energy upwardly from the beam divider through the lens OL1 to the inclination prism OUP where it will be radiated out in the generally horizontal direction as illustrated in FIG. 1.

Figure 2:
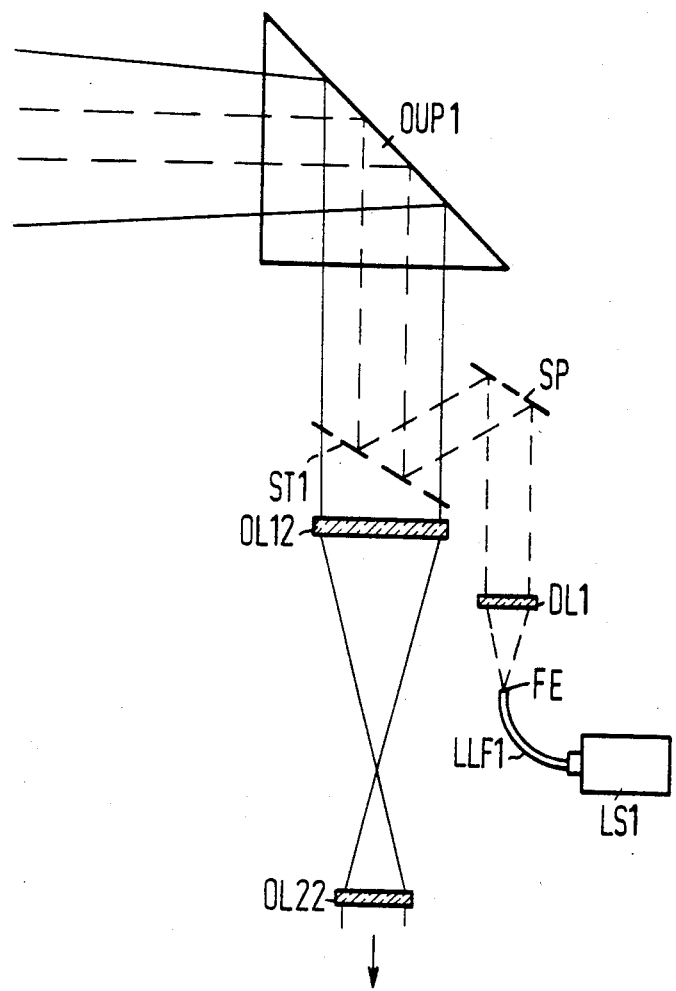
FIG. 2 illustrates a modification of the invention.

FIG. 2 is a modification of the invention illustrated in FIG. 1 wherein the beam divider ST1 has been moved so as to be between the lens OL12 and the inclination prism OUP1. A reflector SP has been mounted so as to direct the laser energy from the additional lens DL1 to the beam splitter ST1. The other elements in the modification of FIG. 2 are the same as illustrated in FIG. 1.

Figure 3:
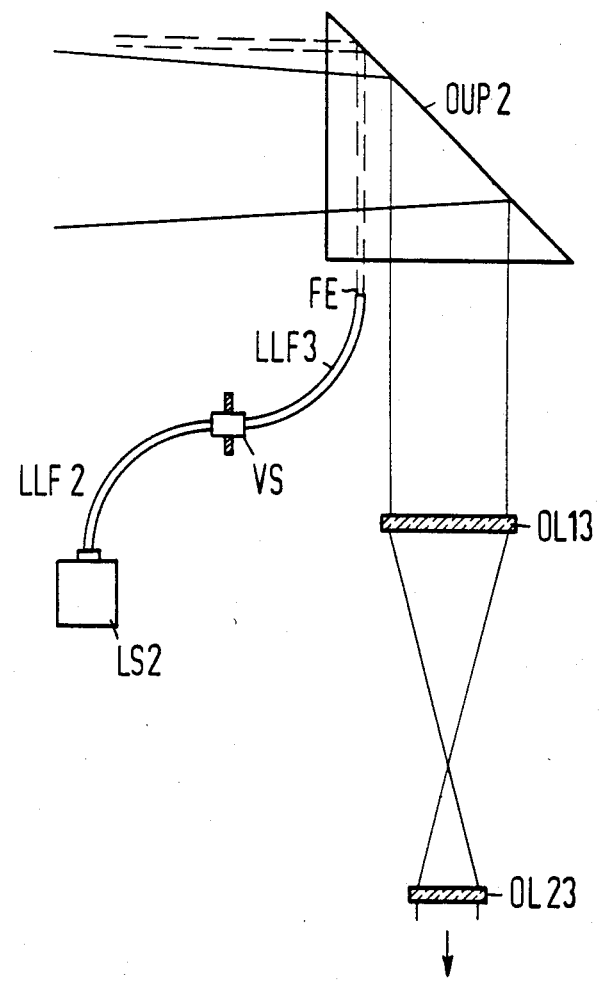
FIG. 3 illustrates a further modification of the invention in which the laser radiation utilizes self-focusing optical fiber bundles for the input coupling into the optical system.

FIG. 3 illustrates a modification of the invention wherein the laser beam is directly coupled into the optical system. The inclination prism OUP and the optical lens OL13 and OL23 corresponds to the optical system illustrated in FIG. 1. The output of the laser LS2 is coupled to a first bunch of optical fibers LF2 which has its other end connected to a connector VS which is connected to a first end of a autofocusing optical fiber bundle LLF3 which has its other end FE mounted near the bottom surface of the inclination prism OUP2 such that it emits the laser energy in a generally vertical direction relative to FIG. 3 so that it will hit the inclination surface of the prism OUP2 and be reflected outwardly parallel to the optical energy in the lens system. A prerequisite for direct coupling as illustrated in FIG. 3 is that the necessary divergence of the laser beam is achieved through the utilization of the autofocusing optical fiber bundle LLF3. In this manner, the focusing of additional lens system is not necessary. The transmission line between the laser transmitter LS2 and the optical system is composed of a conventional optical fiber bundle LLF2 as well as the autofocusing optical fiber bundle LLF3 which are interconnected with a connector VS. The input coupling position of the laser beam into the optical system is selected such that the divergence of the laser beam will no longer be influenced by the optical lens system.

Similar to the arrangement in FIG. 2, the input coupling of the laser beam is parallel to the optical axis of the optical system.

Figure 4:
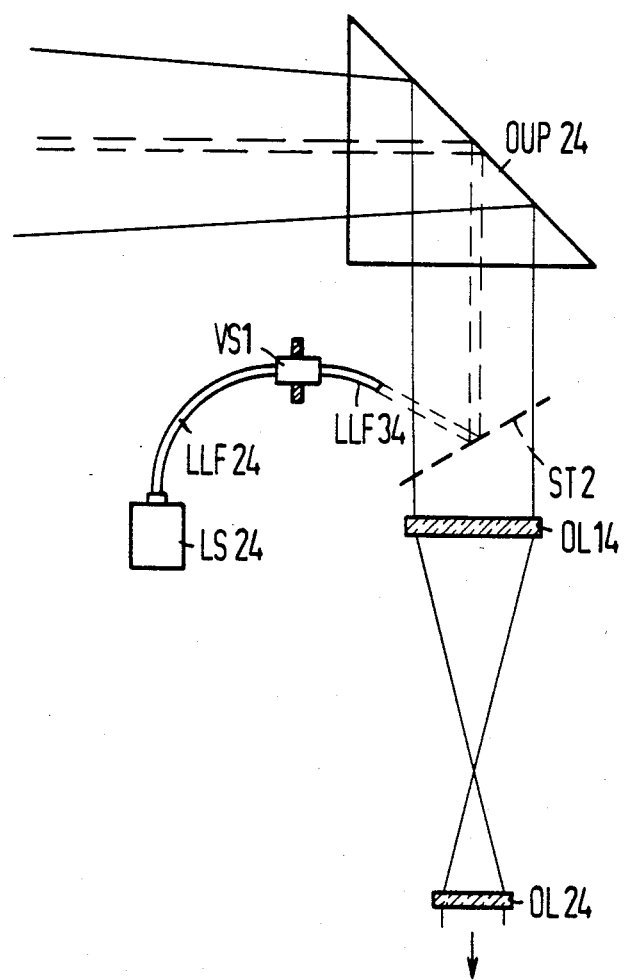
FIG. 4 illustrates a further modification of the invention which uses self-focusing optical fiber bundle for the input coupling.

FIG. 4 illustrates a modification of the invention which differs from that illustrated in FIG. 3 in that the output of the laser LS24 is coupled to conventional fiber bundle LLF24 which has its other end connected to a connector VS1 which is connected to one end of an autofocusing optical fiber bundle LLF34 which directs the output laser energy to a beam divider ST2 mounted in the optical axis of the optical system between the lens OL14 and the inclination prism OUP24. In this arrangement, the laser beam divergence will not be altered.

The utilization of the optical fiber bundle which is adapted to the laser transmitter and which has a front end FE that acts as an emission surface as compared with a direct emission from the beam divergence surface of the laser transmitter has the advantage that the centering of the emission surface is simpler and the natural aperture angle of the laser beam is reduced.

Common to all of the embodiments illustrated in FIGS. 1 through 4 is that the laser beam assuming a beam divergence such as 5 mrad always corresponds to the sighting line. The inventions therefore provide that in the case of a sighting line of the optical system which is adjusted depending upon the tube superelevation of the weapon results in automatic compensating follow-up of the laser beam. This can be realized such that through a relatively minor displacement of the additional lens system DL or DL1, respectively, in FIGS. 1 and 2 embodiments relative to the optical fiber LLF or LLF1, respectively, the emergence angle of the laser beam will be only slightly displaced. Another solution consists in that the beam dividers ST or ST1 or ST2 corresponding respectively to the FIGS. 1, 2 and 4 embodiments are rotated by half the tube superelevation angle.

Although the invention has been described with respect to preferred embodiments, it is not to be so limited as changes and modifications can be made which are within the full intended scope of the invention as defined by the appended claims.

We claim as our invention:

1. A directional and observation means for a weapons systems, consisting of an optical system in which a prism of the lens system is also utilized for a laser transmitter and the laser transmitter being disposed outside the optical path of said optical system, and an optical fiber for transmitting the laser radiation to the optical system, one end of said optical fiber connected to a surface of the laser transmitter which emits laser radiation, and the other end of said optical fiber is an emission surface, and including a self-focusing optical fiber bundle mounted between said other end of said optical fiber bundle and said inclination prism.

2. A directional and observation means for a weapons systems, consisting of an optical system including a periscope with an inclination prism which is also utilized for a laser transmitter and wherein the laser transmitter is disposed outside of the optical path of the optical system, an optical fiber bundle for transmitting the laser radiation to the optical system, one end of said optical fiber bundle being connected to a surface of the laser transmitter which emits laser radiation, and the other end of said optical fiber bundle being an emission surface, which input couples the laser radiation into said optical path of the system through said inclination prism and including a self-focussing optical fiber bundle mounted between said other end of said optical fiber bundle and said inclination prism.

3. A direction and observation device according to claim 2 including a connector mounted between the other end of said optical fiber bundle and a first end of said self-focussing optical fiber bundle.

* * * * *